United States Patent
Dorbes et al.

(10) Patent No.: US 9,008,713 B2
(45) Date of Patent: Apr. 14, 2015

(54) METHOD OF CUTTING OFF A TRANSMISSION SIGNAL OF A MAIN TRANSMITTER RELAYED BY A CELL OF A BASE STATION AND ASSOCIATED SYSTEM

(75) Inventors: Stephane Dorbes, Ruaudin (FR); Christophe Mignot, Rouillon (FR)

(73) Assignee: ST-Ericsson SA, Plan-les-Ouates (CH)

( * ) Notice: Subject to any disclaimer, the term of this patent is extended or adjusted under 35 U.S.C. 154(b) by 296 days.

(21) Appl. No.: 13/260,769

(22) PCT Filed: Apr. 1, 2010

(86) PCT No.: PCT/EP2010/054429
§ 371 (c)(1),
(2), (4) Date: Dec. 20, 2011

(87) PCT Pub. No.: WO2010/112590
PCT Pub. Date: Oct. 7, 2010

(65) Prior Publication Data
US 2012/0115533 A1    May 10, 2012

(30) Foreign Application Priority Data

Apr. 3, 2009    (FR) ..................... 09 52204

(51) Int. Cl.
  H04B 7/00      (2006.01)
  H04B 1/00      (2006.01)
  H04B 1/04      (2006.01)
  H04W 52/22     (2009.01)
  H04W 52/36     (2009.01)
(52) U.S. Cl.
  CPC .......... *H04W 52/221* (2013.01); *H04W 52/228* (2013.01); *H04W 52/367* (2013.01)

(58) Field of Classification Search
  CPC ............................ H04W 36/18; H04W 52/221
  USPC ......... 455/522, 69, 127.1, 67.11, 67.13, 63.1, 455/226.1
  See application file for complete search history.

(56) References Cited

U.S. PATENT DOCUMENTS

| | | | |
|---|---|---|---|
| 6,343,218 B1 * | 1/2002 | Kaneda et al. | 455/522 |
| 6,418,137 B1 * | 7/2002 | Bontu et al. | 370/347 |
| 6,449,461 B1 * | 9/2002 | Otten | 455/63.1 |
| 6,735,447 B1 * | 5/2004 | Muller | 455/522 |
| 8,538,472 B2 * | 9/2013 | Dawid et al. | 455/522 |

(Continued)

FOREIGN PATENT DOCUMENTS

| | | |
|---|---|---|
| GB | 2355887 A | 5/2001 |
| WO | 01/43296 A2 | 6/2001 |
| WO | 2008/095958 A1 | 8/2008 |

OTHER PUBLICATIONS

International Search Report for PCT/EP2010/0054429 mailed May 31, 2010.

*Primary Examiner* — Tilahun B Gesesse
(74) *Attorney, Agent, or Firm* — Patent Portfolio Builders PLLC

(57) ABSTRACT

Method of cutting off a transmission signal of a main transmitter relayed by a cell of a base station and associated system. According to this method, the transmission signal is cut off:—if the power of the transmission signal emitted by the main transmitter is greater than the power of each transmission signal of other transmitters relayed by the same cell of the base station, and—if the power of the transmission signal of the main transmitter does not decrease after several identical successive transmitted-power regulating commands (TPC) emitted by the base station.

12 Claims, 2 Drawing Sheets

(56) References Cited

U.S. PATENT DOCUMENTS

| | | | |
|---|---|---|---|
| 2004/0071117 A1* | 4/2004 | Jung et al. ............... | 370/335 |
| 2006/0105796 A1* | 5/2006 | Malladi et al. ............ | 455/522 |
| 2008/0004064 A1* | 1/2008 | Sakurai et al. ............ | 455/522 |

* cited by examiner

METHOD OF CUTTING OFF A TRANSMISSION SIGNAL OF A MAIN TRANSMITTER RELAYED BY A CELL OF A BASE STATION AND ASSOCIATED SYSTEM

RELATED APPLICATIONS

This application is a 371 National Stage of International Application No. PCT/EP2010/054429, filed Apr. 1, 2010, which claims priority and benefit from French Application No. 0952204, filed Apr. 3, 2009, the entire teachings of which are incorporated herein by reference.

TECHNICAL FIELD

The invention relates to second, third and fourth generation mobile telephone technologies including Long Term Evolution (LTE) as well as to all cellular radiocommunication systems based on a power regulating technique, and more particularly the cutting off of a transmission signal of a main transmitter relayed by a cell of a base station.

BACKGROUND

In the field of telecommunications, the technologies dubbed Universal Mobile Telecommunications System (UMTS), CDMA, CDMA2000 and CDMA 2000 1xEV-DO are based on a transmission coding entitled "Code Division Multiple Access" (denoted CDMA). This CDMA code is based on a spread spectrum technique ("Direct Sequence Spread Spectrum"). It allows several digital links to use the same carrier frequency simultaneously.

The spreading of the spectra by the CDMA code is carried out by means of a code allocated to each communication. The receiver uses this same code to demodulate the signal that it receives and extract the useful information. Each user uses a different code.

The receiving base station (in general denoted "node B" for UMTS technology) receives the sum of the spread signals of various users. The total signal received is then correlated with the spreading code of a desired user. The effect of this is to restore the signal of the desired user and to attenuate the signals of the other users. Given the spreading of the spectra at the base station considering only one user, all the other users are perceived as noise. For this reason, the network adjusts the output power of each user so as to receive them all at the same level for one and the same user service, that is to say all at the same signal/noise ratio.

If there is a significant difference in a signal/noise ratio between one user and the other users of one and the same cell of a base station, the base station will not be capable of decoding the other users. Indeed, the other users will be hidden by the user having the signal with the highest transmission power.

SUMMARY

It is thus proposed to solve the drawbacks mentioned above by cutting off the transmission signal of a main transmitter having a power greater than the other transmitters of one and the same base station cell, so as to avoid the faltering of a base station cell because of a single failing user.

According to one aspect, there is proposed, in one mode of implementation, a method of cutting off a transmission signal of a main transmitter relayed by a cell of a base station.

In this method, the transmission signal is cut off:

if the power of the transmission signal emitted by the main transmitter is greater than the power of each transmission signal of other transmitters relayed by the same cell of the base station, and if the power of the transmission signal of the main transmitter does not decrease after several successive and identical transmitted-power regulating commands emitted by the base station.

Thus, if a main transmitter emits towards a base station a transmission signal having a power greater than the powers of the transmission signals emitted by other users towards the same base station, and if the power of this transmission signal is not decreased despite the dispatching of commands for regulating power transmitted by the base station to the transmitter, then the transmission signal of the main transmitter will be cut off.

Preferably, the power variation commands of the transmitted-power regulating commands emitted by a base station, on the one hand, are summed and the corresponding variations of effective power that are emitted by the main transmitter, on the other hand, are summed for a number of transmitted-power regulating commands, the sum of the power variation commands is compared with the sum of the variations of corresponding effective power, and the transmission signal of the main transmitter is cut off if the sum of the power variation commands is different from the sum of the variations of corresponding effective power.

The power variation commands of the transmitted-power regulating commands emitted by the base station, on the one hand, and the corresponding variations of effective power that are emitted by the main transmitter, on the other hand, are advantageously summed for a number of transmitted-power regulating commands, if the effective power emitted by the main transmitter is greater than an effective-power threshold.

The sum of the power variation commands is preferably compared with the sum of the corresponding variations of effective power if the sum of the power variation commands is greater than a control power variation threshold.

Thus, the comparison between the commands of power variations and the effective power variation is carried out only if the commands of power variations are significant and in the same direction of variation for a number of given commands.

Advantageously, a subtraction is carried out between the sum of the power variation commands and the sum of the corresponding variations of effective power, and the transmission signal of the main transmitter is cut off if the difference between the sum of the power variation commands and the sum of the corresponding variations of effective power is greater than a tolerance threshold.

According to another aspect, there is proposed, in one embodiment, a system for cutting off the transmission signal of a main transmitter relayed by a base station cell, the main transmitter comprising means for receiving transmitted-power regulating commands emitted by a base station, and means for transmitting the signal emitted by the main transmitter.

This system comprises first integration means able to compute a sum of the power variation commands of the transmitted-power regulating commands emitted by the base station, second integration means able to compute a sum of the corresponding variations of effective power that are emitted by the main transmitter, comparison means able to compare the sum of the power variation commands with the sum of the corresponding variations of effective power, and means for generating a cut-off signal.

Advantageously, this system comprises parameterization means able to deliver a signal indicating the moment of starting of the first and second integration means, and the number of transmitted-power regulating commands for which the sums are computed.

Preferably, the system comprises a threshold module able to deliver an effective-power threshold above which the system operates. It advantageously comprises a first comparison module able to compare the sum of the power variation commands of the transmitted-power regulating commands with a control power variation threshold value.

The comparison means preferably comprise a subtraction module able to compute the difference between the sum of the power variation commands and the sum of the corresponding variations of effective power. The comparison means advantageously comprise a second comparison module able to compare the difference between the sum of the power variation commands and the sum of the corresponding variations of effective power with a tolerance threshold value.

Preferably, the main transmitter is a European third-generation mobile telephone, and the base stations are base stations of a network of Universal Mobile Telecommunications System type.

BRIEF DESCRIPTION OF THE DRAWINGS

Other advantages and characteristics of the invention will be apparent on examining the detailed description of the wholly non-limiting embodiments and modes of implementation and the appended drawings, in which.

DETAILED DESCRIPTION

Figure 1:
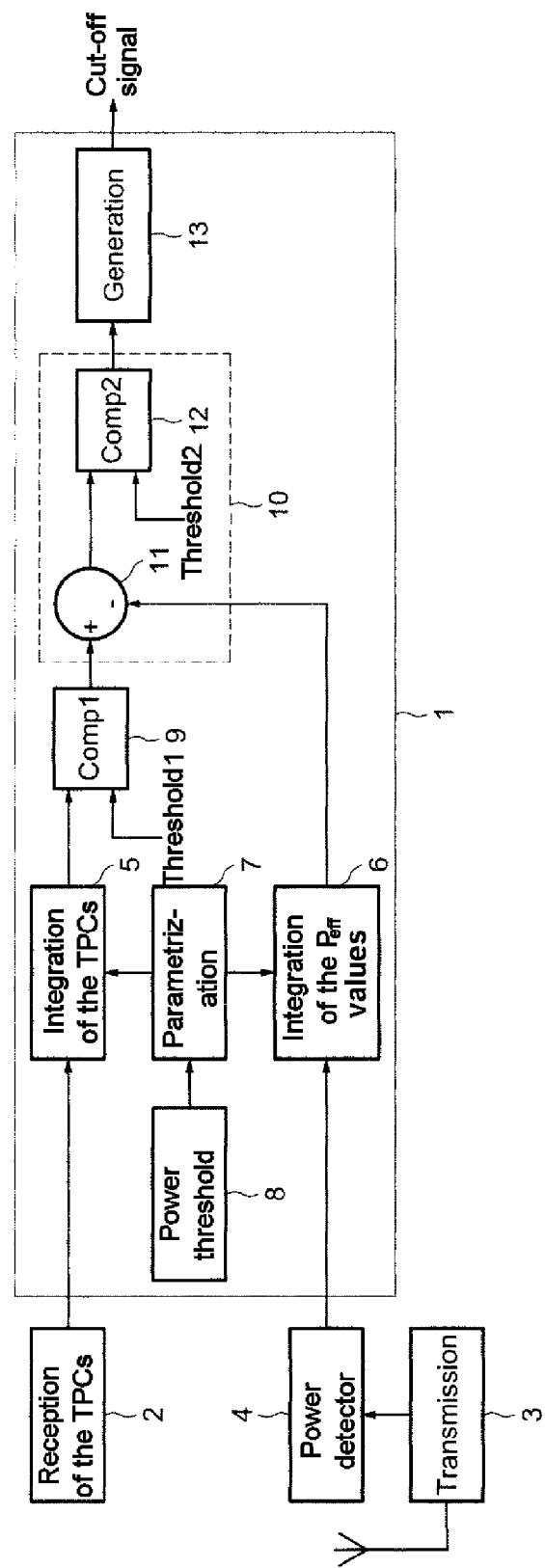
FIG. 1 represents, in a schematic manner, a system for cutting off the transmission signal of a main transmitter relayed by a cell of a base station.

A system 1 for cutting off the transmission signal of a main transmitter relayed by a cell of a base station is represented in a schematic manner in FIG. 1. The main transmitter comprises means 2 for receiving transmitted-power regulating commands (TPC) emitted by a base station. It also comprises means 3 for transmitting the signal emitted by the main transmitter, as well as means 4 for detecting the power transmitted by the transmitter, coupled to the means 3 for transmitting the signal emitted by the main transmitter.

The system 1 for cutting off the transmission signal of a main transmitter relayed by a cell of a base station comprises means 5 for integrating the transmitted-power regulating commands, means 6 for integrating the effective power emitted, parameterization means 7, a threshold module 8, first comparison means 9, second comparison means 10, and means 13 for generating a cut-off signal.

When a cell of a base station receives a transmission signal from a transmitter which possesses a greater power than the other transmission signals of the other transmitters received by the same cell of the said base station, it dispatches signals of transmitted-power regulating commands to the transmitter possessing the signal of greater power so as to command a reduction in the power of the transmission signal of the transmitter possessing the signal of greater power. These signals of transmitted-power regulating commands emitted by the base station are received by the main transmitter with the aid of means 2 for receiving transmitted-power regulating commands. The transmitted-power regulating commands are then delivered to the first integration means 5 of the system 1.

The power of the signal transmitted by the means 3 for transmitting the signal emitted by the main transmitter is detected with the aid of means 4 for detecting the emitted power. The power thus detected by the power detection means 4 is then transmitted to the second integration means 6 of the system 1.

A sum of the power variation commands of the transmitted-power regulating commands emitted by the base station is computed by the first integration means 5. Likewise, a sum of the corresponding variations of effective power that are emitted by the main transmitter is computed by the second integration means 6. These two sums are thus computed for one and the same number of transmitted-power regulating commands.

The number of transmitted-power regulating commands for which the sums are computed is delivered to the first integration means 5 and to the second integration means 6 by the parameterization means 7. The parameterization means 7 receive as input an effective-power threshold delivered by a threshold module 8 pertaining to a threshold above which the system 1 operates. The parameterization means thus controls the operation of the system 1 determining whether the effective power is greater than an effective-power threshold, and by defining the number of transmitted-power regulating commands for which the two sums are computed in correspondence.

The parameterization means 7 thus deliver to the first and second integration means 5 and 6 the time interval over which the integration is performed.

Before comparing the sum of the power variations of the transmitted-power regulating commands, which is delivered by the first integration means 5, with the sum of the corresponding effective powers emitted by the main transmitter, which is delivered by the second integration means 6, the sum of the power variation commands is compared with a controls power variation threshold (threshold1).

If the sum of the commands of power variations is less than this controls power variation threshold, then the power variations emitted by the base station are not considered to be significant, and the cut-off system 1 does not deliver any signal for cutting off the transmission signal of the main transmitter.

On the other hand, if the sum of the commands of power variations is greater than the controls power variation threshold (threshold1), the sum of the power variations is compared with the sum of the corresponding effective powers emitted by the main transmitter with the aid of comparison means 10.

The comparison means 10 comprise a subtraction module 11 able to calculate the discrepancy between the sum of the power variation commands and the sum of the corresponding variations of effective power. The subtraction module 11 then delivers the signal resulting from the subtraction to a second comparison module 12 able to compare the difference between the sum of the power variation commands and the sum of the variations of corresponding effective power with a tolerance threshold value (threshold2).

This tolerance threshold makes it possible to define a tolerance for the difference between the sum of the commands of power variations and the sum of the effective powers, so as to be able to define the reactivity of the system. The tolerance threshold thus makes it possible to define an error margin around which the discrepancy between the two sums is considered to be negligible. This tolerance threshold makes it possible to avoid untimely cut-offs as soon as there is a discrepancy between the two sums.

If the difference between the sum of the commands of power variations and the sum of the corresponding effective power variations is greater than the value of the tolerance threshold, then a signal is delivered by the comparison means 10 to the means 13 for generating a cut-off signal which therefore generate a cut-off signal so as to cut off the signal emitted by the main transmitter.

Figure 2:
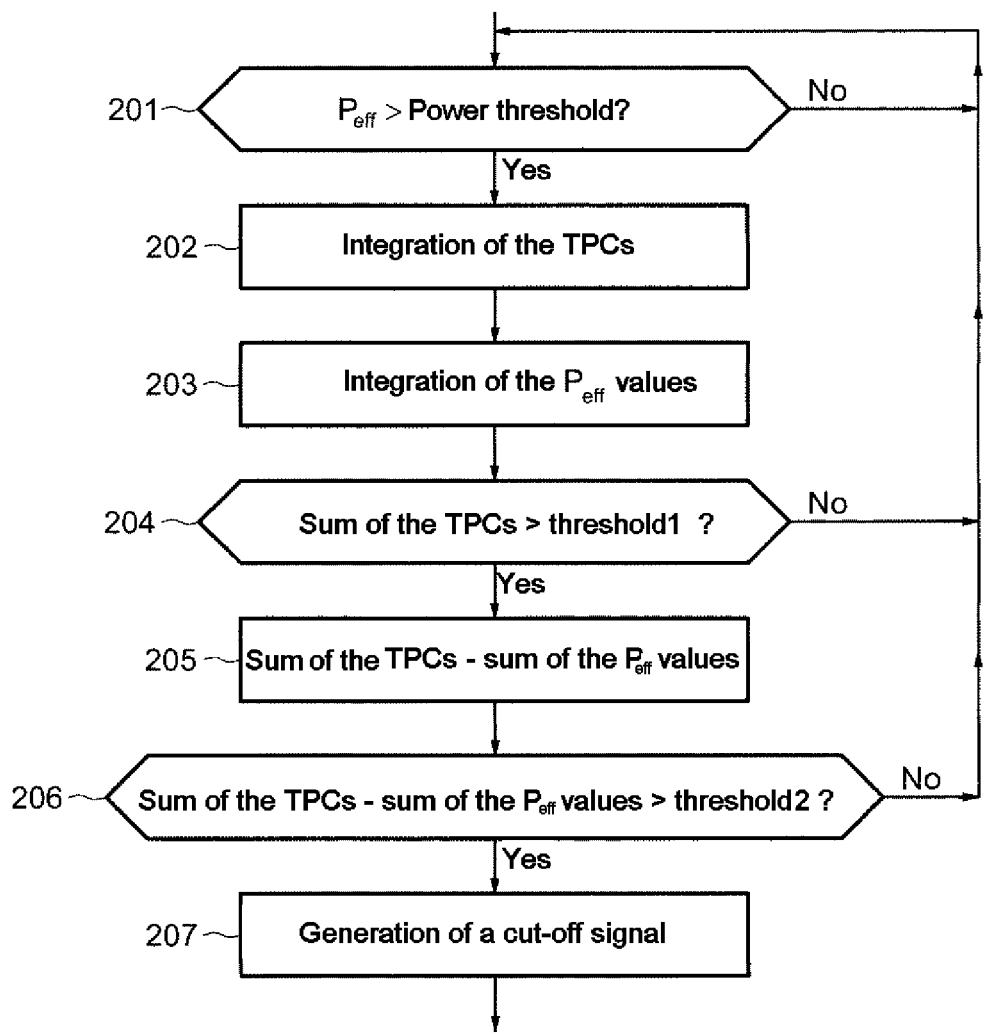
FIG. 2 represents a schematic of a method of cutting off a transmission signal at a main transmitter relayed by a cell of a base station.

FIG. 2 represents a schematic of a method of cutting off a transmission signal of a main transmitter relayed by a cell of a base station.

In a first step 201 of this method, the effective power of the transmission signal emitted by the main transmitter is compared with an effective-power threshold. If the effective power of the transmission signal is less than the effective-power threshold, the cut-off method is not started.

If, on the other hand, the effective power is greater than the power threshold, then, in a following step 202, the commands of power variations of the transmitted-power regulating commands (TPC) emitted by the base station are integrated for a transmitted-power regulating command number.

In a following step 203, the corresponding variations of effective power that are emitted by the main transmitter are integrated for the said given number of transmitted-power regulating commands.

In a following step 204, the sum of the commands of power variations of the transmitted-power regulating commands (TPC) is compared with a controls power variation threshold.

If the sum of the power variations of the transmitted-power regulating commands is greater than the threshold, then a subtraction between the sum of the commands of power variations and the sum of the corresponding variations of effective power is performed in a step 205. Otherwise the method is exited so as to redo the first step 201.

In a step 206, the difference between the sum of the commands of power variations and the sum of the corresponding variations of effective power is compared with a tolerance threshold. If the difference between the sum of the commands of power variations and the sum of the corresponding variations of effective power is greater than the tolerance threshold, then a signal for cutting off the transmission signal of a main transmitter is generated in a final step 207.

The invention claimed is:

1. A method of cutting off a transmission signal of a main transmitter of a mobile telephone relayed by a cell of a base station, the method comprising:
   cutting off the transmission signal by the main transmitter of the mobile telephone if the power of the transmission signal emitted by the main transmitter of the mobile telephone is greater than the power of each transmission signal of other transmitters relayed by the same cell of the base station, and
   if the power of the transmission signal of the main transmitter of the mobile telephone does not decrease after several identical successive transmitted-power regulating commands (TPC) emitted by the base station.

2. The method according to claim 1, in which the power variation commands of the transmitted-power regulating commands (TPC) emitted by the base station are summed and the corresponding variations of effective power that are emitted by the main transmitter are summed for a number of transmitted-power regulating commands (TPC), the sum of the power variation commands is compared with the sum of the variations of corresponding effective power, and the transmission signal of the main transmitter is cut off by the main transmitter if the sum of the power variation commands is different from the sum of the variations of corresponding effective power.

3. The method according to claim 2, in which the power variation commands of the transmitted-power regulating commands (TPC) emitted by the base station and the corresponding variations of effective power that are emitted by the main transmitter are summed for a number of transmitted-power regulating commands, if the effective power emitted by the main transmitter is greater than an effective-power threshold (Power threshold).

4. The method according to claim 2, in which the sum of the power variation commands is compared with the sum of the variations of corresponding effective power if the sum of the power variation commands is greater than a control power variation threshold (threshold1).

5. The method according to claim 2, in which a subtraction is carried out between the sum of the power variation commands and the sum of the variations of corresponding effective power, and the transmission signal of the main transmitter is cut off by the main transmitter if the difference between the sum of the power variation commands and the sum of the variations of corresponding effective power is greater than a tolerance threshold (threshold2).

6. A system for cutting off the transmission signal of a main transmitter of a mobile telephone relayed by a cell of a base station, the system comprising: the main transmitter of the mobile telephone comprising a receiver to receive transmitted-power regulating commands (TPC) emitted by a base station and a transmitter to transmit the signal emitted by the main transmitter, comprising a first integrator to compute a sum of the power variation commands of the transmitted-power regulating commands (TPC) emitted by the base station, a second integrator to compute a sum of the corresponding variations of effective power that are emitted by the main transmitter, a comparator to compare the sum of the power variation commands with the sum of the variations of corresponding effective power, and a generator to generate a cut-off signal for the main transmitter of the mobile telephone, the generator being of the main transmitter.

7. The system according to claim 6, comprising a parameterizer to deliver a signal indicating the moment of starting of the first and second integrators, and the number of transmitted-power regulating commands (TPC) for which the sums are computed.

8. The system according to claim 6, comprising a threshold module able to deliver an effective-power threshold (Power threshold) above which the system operates.

9. The system according to claim 6, comprising a first comparison module able to compare the sum of the power variation commands of the transmitted-power regulating commands with a control power variation threshold value (threshold1).

10. The system according to claim 6, in which the comparator comprise a subtraction module able to compute the difference between the sum of the power variation commands and the sum of the variations of corresponding effective power.

11. The system according to claim 6, in which the comparator comprise a second comparison module able to compare the difference between the sum of the power variation commands and the sum of the variations of corresponding effective power with a tolerance threshold value (threshold2).

12. The system according to claim 6, in which the mobile telephone is a European third-generation mobile telephone, and the base stations are base stations of a network of Universal Mobile Telecommunications System type.

\* \* \* \* \*